(12) United States Patent
Shimizu

(10) Patent No.: US 8,076,633 B2
(45) Date of Patent: Dec. 13, 2011

(54) NIGHT VISION APPARATUS

(75) Inventor: Seiya Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 53 days.

(21) Appl. No.: 12/574,058

(22) Filed: Oct. 6, 2009

(65) Prior Publication Data

US 2010/0019151 A1 Jan. 28, 2010

Related U.S. Application Data

(63) Continuation of application No. PCT/JP2007/059473, filed on May 7, 2007.

(51) Int. Cl.
*G01D 18/00* (2006.01)
(52) U.S. Cl. .................................... 250/252.1
(58) Field of Classification Search .................. None
See application file for complete search history.

(56) References Cited

U.S. PATENT DOCUMENTS

2006/0008171 A1* 1/2006 Petschnigg et al. ........... 382/254

FOREIGN PATENT DOCUMENTS

| JP | 2000-078456 | 3/2000 |
|----|-------------|--------|
| JP | 2000-115759 | 4/2000 |
| JP | 2002-274258 | 9/2002 |
| JP | 2003-087644 | 3/2003 |
| JP | 2005-222549 | 8/2005 |
| JP | 2006-259829 | 9/2006 |

OTHER PUBLICATIONS

International Search Report for PCT/JP2007/059473, mailed Jul. 24, 2007 (English and Japanese).

* cited by examiner

*Primary Examiner* — David Porta
*Assistant Examiner* — Carolyn Igyarto
(74) *Attorney, Agent, or Firm* — Staas & Halsey LLP

(57) ABSTRACT

A night vision image processing unit (night vision apparatus) separates an input field image that a field separating unit has acquired from a near-infrared camera into an odd-numbered field image and an even-numbered field image. A region segmenting unit segments an image into a plurality of regions (a luminous region, a high-reflection region, a low-luminance region) based on luminance value of each pixel included in the odd-numbered field image and the even-numbered field image. A luminous region processing unit, a high-reflection region processing unit, and a low-luminance region processing unit correct the luminance value according to characteristics of the regions.

4 Claims, 21 Drawing Sheets

REGION SEGMENTATION TABLE

| REGION | ODD-NUMBERED FIELD IMAGE | EVEN-NUMBERED FIELD IMAGE |
|---|---|---|
| LUMINOUS REGION | LARGER THAN FIRST THRESHOLD | LARGER THAN SECOND THRESHOLD |
| HIGH-REFLECTION REGION | SMALLER THAN THIRD THRESHOLD | LARGER THAN FOURTH THRESHOLD |
| LOW-LUMINANCE REGION | OTHER THAN ABOVE | |

HIGH-REFLECTION REGION LUMINANCE CONVERSION TABLE

| INPUT LUMINANCE VALUE | OUTPUT LUMINANCE VALUE |
|---|---|
| 1 | 2.55 |
| 2 | 5.1 |
| ⋮ | ⋮ |
| 100 | 255 |

LOW-LUMINANCE REGION LUMINANCE CONVERSION TABLE

| INPUT LUMINANCE VALUE | OUTPUT LUMINANCE VALUE |
|---|---|
| 1 | 3.19 |
| 2 | 6.38 |
| ⋮ | ⋮ |
| 80 | 255 |

CONVENTIONAL MANNER

PRESENT MANNER

NIGHT VISION APPARATUS

CROSS-REFERENCE TO RELATED APPLICATION(S)

This application is a continuation of International Application No. PCT/JP2007/059473, filed on May 7, 2007, the entire contents of which are incorporated herein by reference.

FIELD

The embodiments discussed herein are directed to a night vision apparatus that takes an image of a subject by using reflected light of infrared light emitted.

BACKGROUND

Recently, for enhancing safety of a driver who drives a vehicle at night (or at the time of low illumination), a technique of mounting a night vision apparatus on a vehicle, and displaying for a driver an image (a night vision image) of a road ahead the vehicle with high visibility has been put into practical use. The night vision apparatus of a vehicle mounting type is classified roughly into a night vision apparatus using a far-infrared system and a night vision apparatus using a near-infrared system.

The night vision apparatus using a far-infrared system realizes its function by imaging heat (far-infrared ray) generated by a person or a vehicle on the road ahead by a far-infrared camera. Because a heat source itself is visualized, imaging is possible even at a circumstance with no lighting. However, in the far-infrared system, imaging is not possible when a background and an object have no difference in temperature, so that road signs, road surface paint, or the like cannot be imaged. Furthermore, the night vision apparatus using a far-infrared system is expensive.

On the other hand, the night vision apparatus using a near-infrared system emits near-infrared light ahead, images the reflected light with a camera that can image a near-infrared wavelength band, and displays the image. The system can image even an object that does not generate heat, and can obtain an image similar to a visual image. Furthermore, the night vision apparatus using a near-infrared system is less expensive than the night vision apparatus using a far-infrared system.

However, the night vision apparatus using a near-infrared system is susceptible to an illuminant with strong light such as a headlight of an opposing vehicle, and cannot read road signs made of a recursive reflection material due to strong reflection.

To solve the problems, a technique of reducing influence of an illuminant by emitting near-infrared light in pulses and correcting a night vision image by using a difference image between an image when lighting and an image when not lighting (see Japanese Laid-open Patent Publication No. 2002-274258 and Japanese Laid-open Patent Publication No. 2003-87644).

However, there has been a problem that even when a night vision image is taken by using a night vision apparatus using a near-infrared system, and the night vision image is corrected by using the conventional techniques (for example, Japanese Laid-open Patent Publication No. 2002-274258 or Japanese Laid-open Patent Publication No. 2003-87644), visibility of an object having certain characteristics (for example, an object made of a recursive reflection material (road signs or the like)) cannot be enhanced.

SUMMARY

According to an aspect of an embodiment of the invention, a night vision apparatus for taking an image of a subject by using reflected light of infrared light emitted, includes an image segmenting unit that segments a taken image into a plurality of regions based on a luminance value of a lighting image that represents an image taken when the infrared light is emitted and a luminance value of a non-lighting image that represents an image taken when the infrared light is not emitted; and a luminance value correcting unit that corrects luminance values of the regions based on characteristics of the regions segmented by the image segmenting unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

A preferred embodiment of the present invention will be explained with reference to accompanying drawings.

[a] First Embodiment

Figure 1:
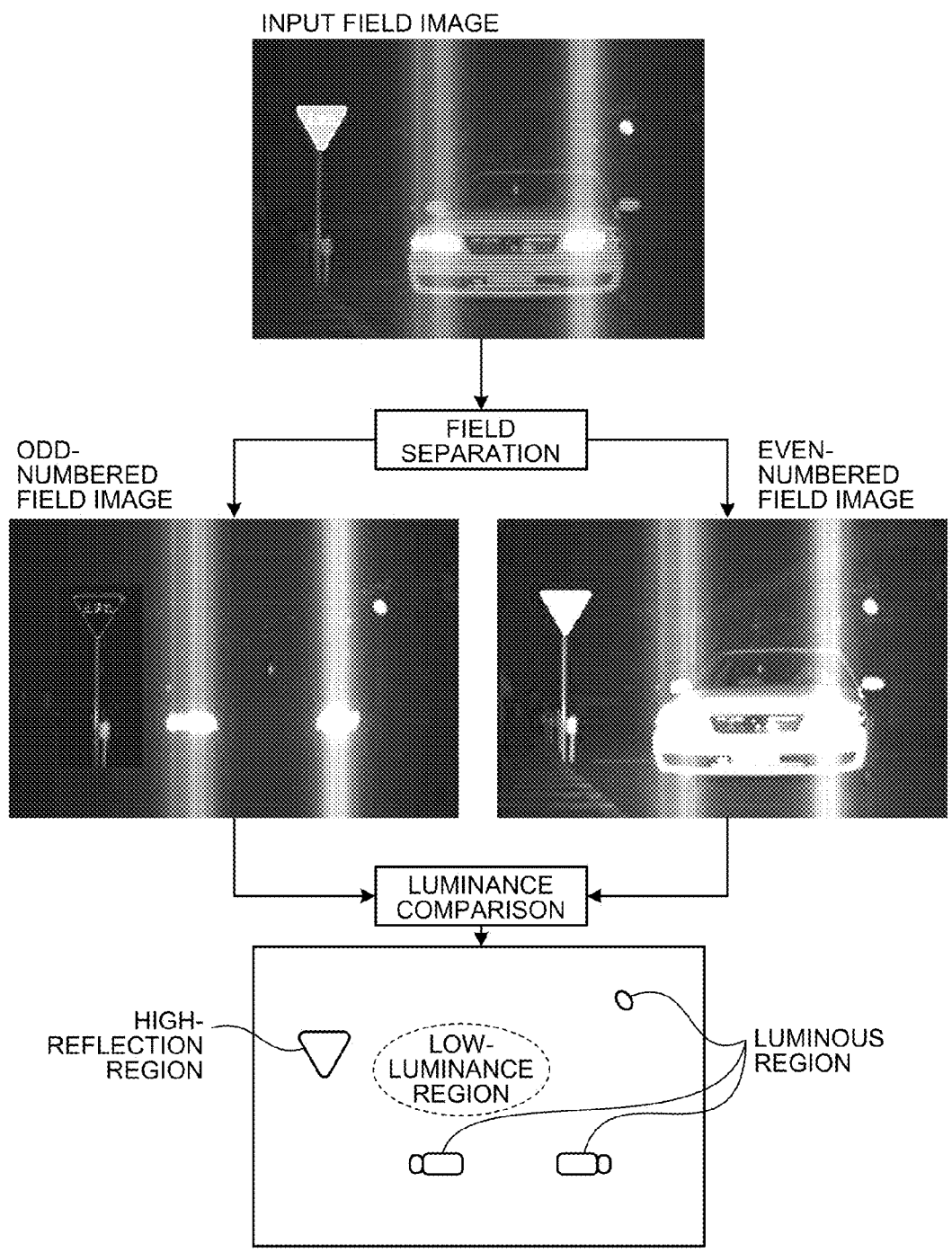
FIG. 1 is a schematic for explaining an outline and characteristics of a night vision apparatus according to a first embodiment.

An outline and characteristics of a night vision apparatus according to a first embodiment are explained. FIG. 1 is a schematic for explaining the outline and the characteristics of the night vision apparatus according to the first embodiment. As depicted in the figure, the night vision apparatus separates an image taken by a near-infrared camera (hereinafter, described as an input field image) into an odd-numbered field image and an even-numbered field image (the input field image is a combination of an image of the odd-numbered field image and the even-numbered field image). The odd-numbered field image represents an image when a subject is not lighted with infrared light, and the even-numbered field image represents an image when the subject is lighted with infrared light.

The night vision apparatus segments an image into a plurality of regions based on the luminance value of the odd-numbered field image and the luminance value of the even-numbered field image, and corrects the luminance value of the segmented regions in accordance of characteristics of the regions. The night vision apparatus according to the fist embodiment segments an image into a luminous region, a high-reflection region, and a low-luminance region.

The luminous region is a region including a self-luminous subject such as a headlight of an opposing vehicle, a taillight of a preceding vehicle, street lighting, and a luminous sign. The high-reflection region is a region that reflects light strongly such as infrared light and visible light, the region including a road sign, a safety post, a rear reflector of a preceding vehicle, a vehicle body (mirror reflection), and the like.

The low-luminance region is a region that does not belong to either of the luminous region and the high-reflection region among the regions of an input field image, the region including a road surface, a pedestrian, another vehicle body (diffuse reflection), a construction, the sky, the background, and the like.

As can be seen, the night vision apparatus according to the first embodiment can enhance visibility of a night vision image regardless of characteristics of a subject by separating an input field image into an odd-numbered field image and an even-numbered field image, segmenting the image into regions based on the luminance value of the odd-numbered field image and the luminance value of the even-numbered field image, and correcting the luminance value of the segmented regions according to characteristics of the regions.

Figure 2:
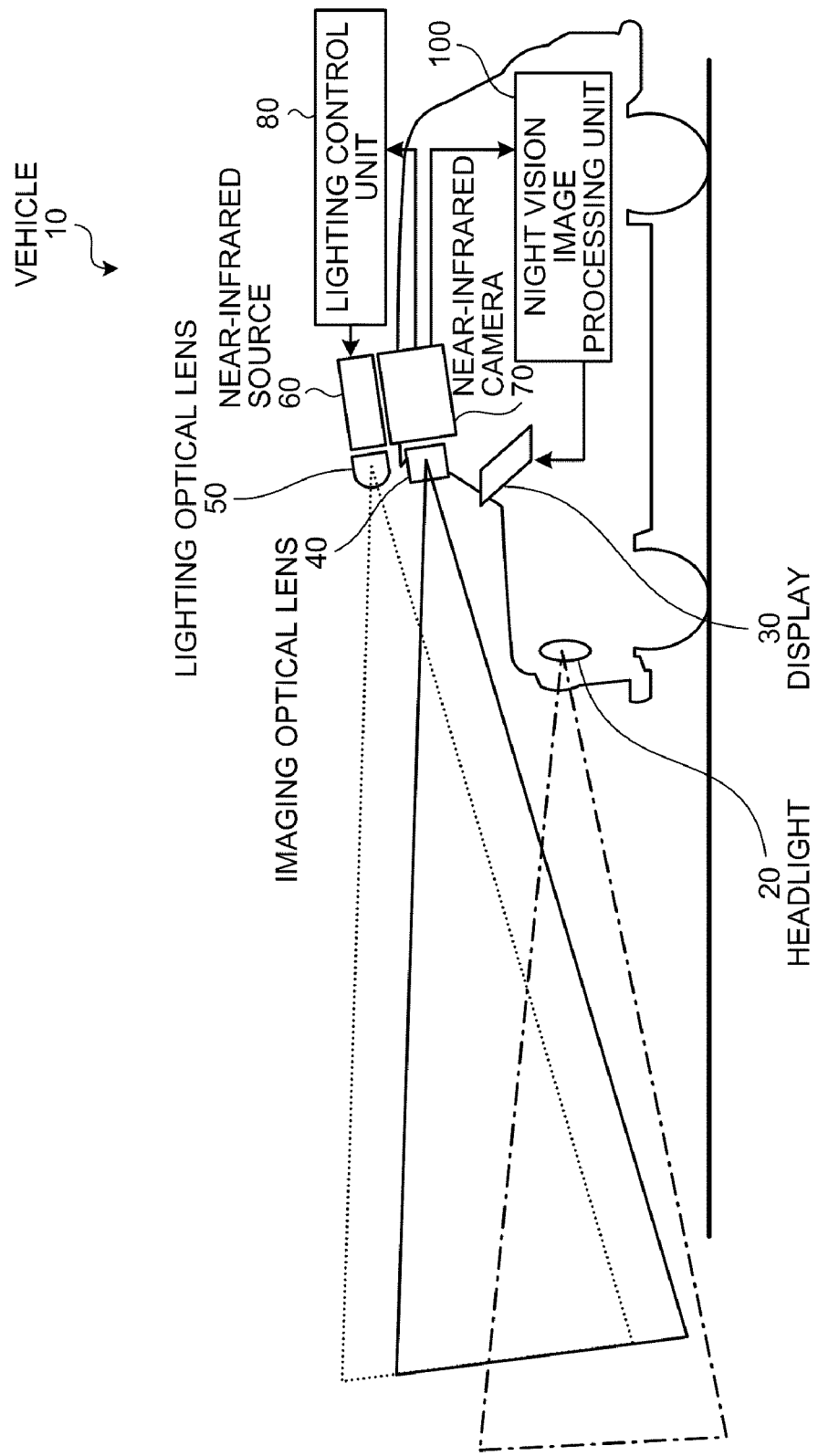
FIG. 2 is a schematic of a configuration of a vehicle on which the night vision apparatus of the first embodiment is mounted.

An exemplary configuration of a vehicle on which the night vision apparatus according to the first embodiment is mounted is explained. FIG. 2 is a schematic of a configuration of a vehicle on which the night vision apparatus of the first embodiment is mounted. As depicted in the figure, a vehicle 10 includes a headlight 20, a display 30, an imaging optical lens 40, a lighting optical lens 50, a near-infrared source (a laser diode, a luminous diode, or the like) 60, a near-infrared camera 70, a lighting control unit 80, and a night vision image processing unit 100.

Among them, the near-infrared source 60 is assumed to be configured to light the view of the near-infrared camera 70. The near-infrared source 60 may be a plurality of light-emitting diodes (LED) combined or may use diffuse lighting of a laser diode.

The near-infrared camera 70 is installed to take the road ahead the vehicle for which a night vision image is created and, for example, is installed horizontally on the vehicle 10. The near-infrared camera 70 is a monochrome charge coupled device (CCD) camera or the like that has a sensitivity of a near-infrared band. A visible light cut filter may be attached to the near-infrared camera 70.

Figure 3:
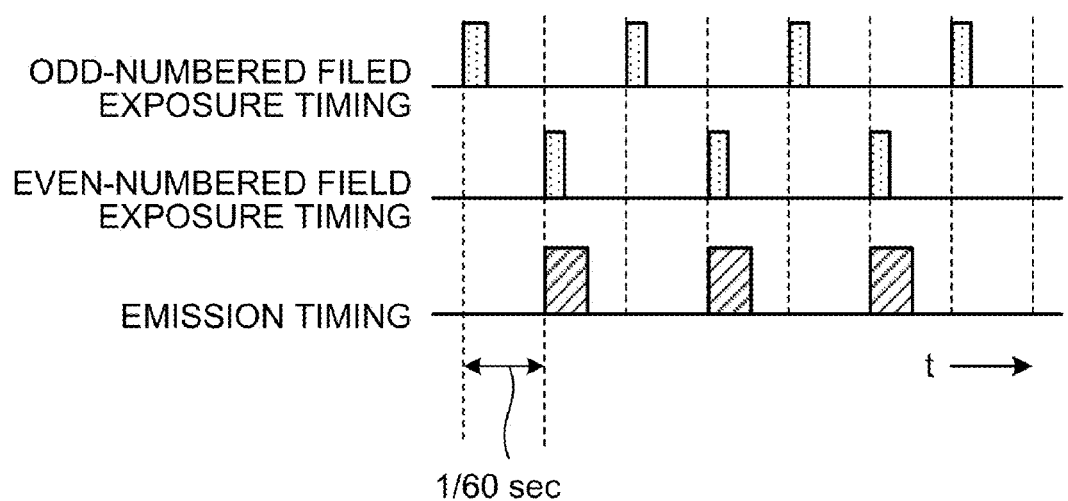
FIG. 3 is a schematic of relationship between an infrared emission timing of a near-infrared source and an exposure timing of a near-infrared camera.

The lighting control unit 80 controls the near-infrared source 60 to emit infrared light intermittently. FIG. 3 is a schematic of relationship between an infrared ray emission timing of the near-infrared source 60 and an exposure timing of the near-infrared camera 70. As depicted in the figure, the lighting control unit 80 controls the near-infrared source 60 so that the infrared ray emission timing synchronizes with a timing of the near-infrared camera 70 imaging an even-numbered field image (even-numbered field exposure timing).

That is, a pixel value with ambient light is recorded in an odd-numbered field by the near-infrared camera 70 taking an odd-numbered field image and an even-numbered field image at the timing depicted in FIG. 3 (the near-infrared camera 70 operates at 30-fps interlace), and the lighting control unit 80 controlling the near-infrared source 60. In contrast to the odd-numbered field exposure timing, a pixel value with ambient light and reflected light of the emitted near-infrared light is recorded at an even-numbered field exposure timing with the time difference of 1/60 sec.

Figure 4:
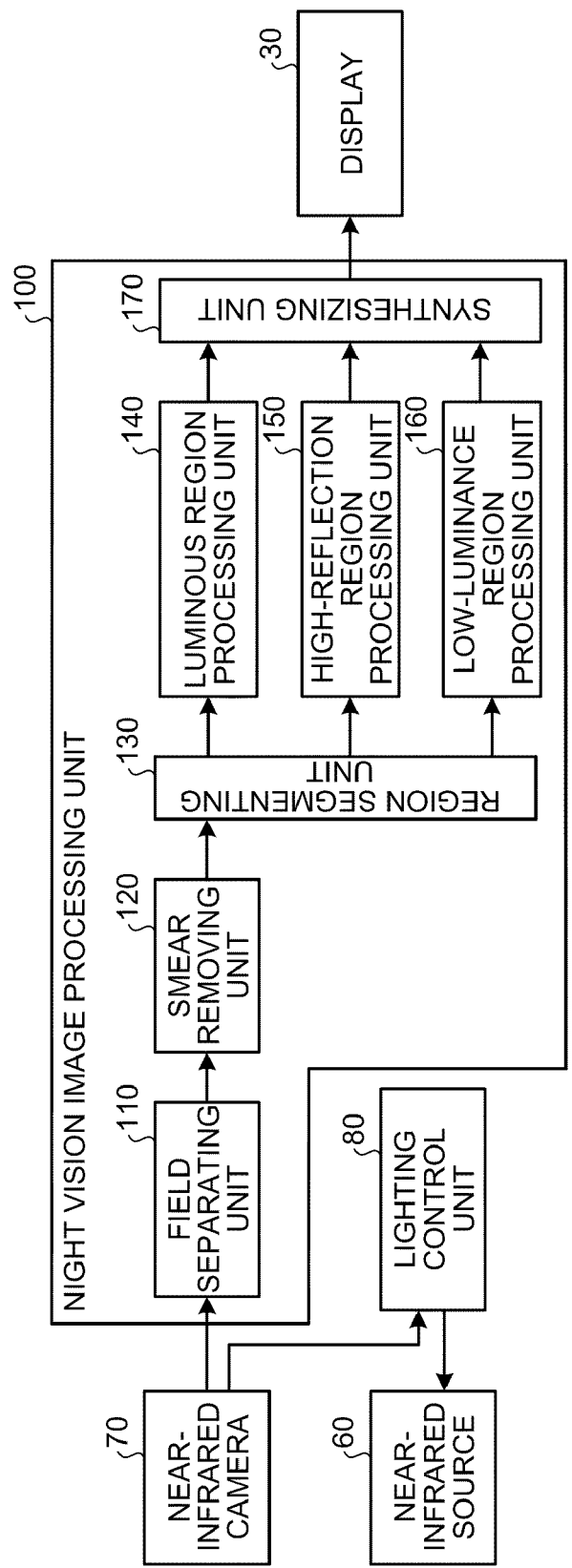
FIG. 4 is a functional block diagram of a configuration of a night vision image processing unit according to the first embodiment.

The night vision image processing unit 100 segments an image into regions based on the luminance value of an odd-numbered field image and the luminance value of an even-numbered field image, and corrects the luminance value of the segmented regions according to the characteristics of the regions (the night vision image processing unit 100 corresponds to the night vision apparatus according to the present invention). FIG. 4 is a functional block diagram of a configuration of the night vision image processing unit 100 according to the first embodiment.

As depicted in the figure, the night vision image processing unit 100 includes a field separating unit 110, a smear removing unit 120, a region segmenting unit 130, a luminous region processing unit 140, a high-reflection region processing unit 150, a low-luminance region processing unit 160, and a synthesizing unit 170.

The field separating unit 110 acquires data of an input field image from the near-infrared camera 70, and separates the acquired input field image into an odd-numbered field image and an even-numbered field image. The field separating unit 110 outputs the data of the separated odd-numbered field image and even-numbered field image to the smear removing unit 120.

Figure 5:
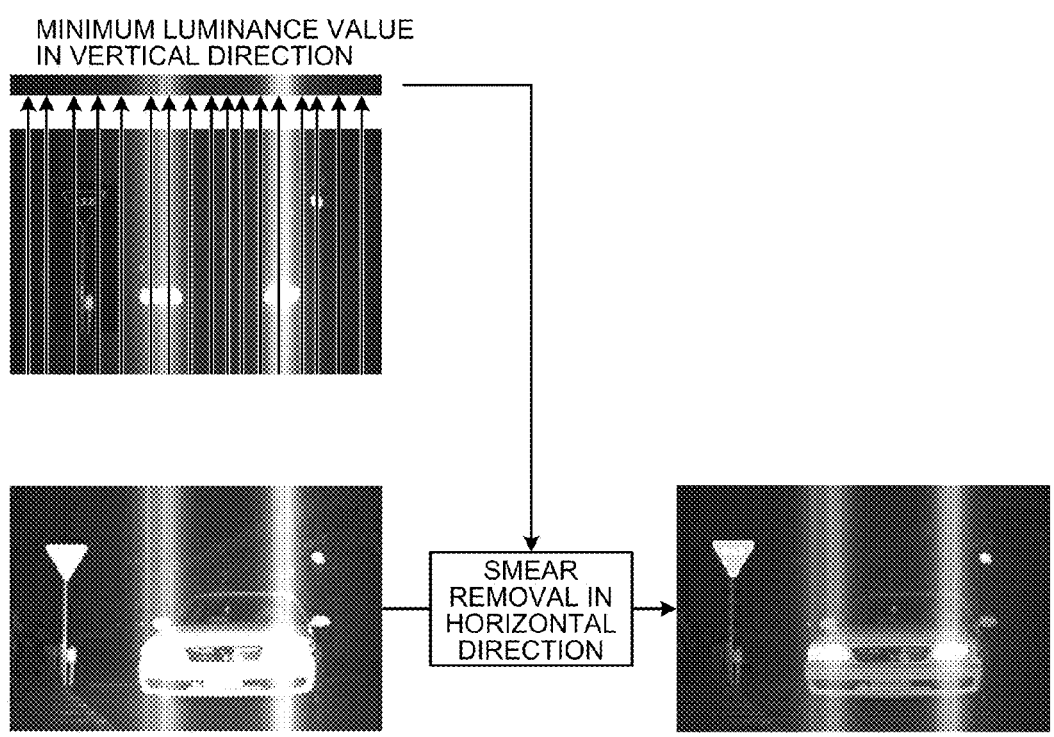
FIG. 5 is a schematic for explaining the processing of a smear removing unit.

The smear removing unit 120 acquires the data of the odd-numbered field image and the even-numbered field image, and removes smear present on the odd-numbered field image and the even-numbered field image. FIG. 5 is a schematic for explaining the processing of the smear removing unit 120.

The smear removing unit 120 first scans the odd-numbered field image, and determines the minimum luminance value of each vertical line. The smear removing unit 120 generates a minimum luminance sequence S(x) in which the minimum luminance value of the vertical lines are arranged sequentially from the minimum luminance value of the leftmost vertical line in the odd-numbered field image. The minimum luminance value arranged at the last in the minimum luminance sequence S(x) is the minimum luminance value of the rightmost vertical line in the odd-numbered field image.

The smear removing unit 120 adjusts the luminance value of the entire odd-numbered field image based on the minimum luminance sequence S(x). For example, when the minimum luminance value of a minimum luminance sequence S(n) (n is a positive integer) is A, the smear removing unit 120 subtracts the minimum luminance value A from each luminance value included in the n-th vertical line from the leftmost odd-numbered field image. A corresponding minimum luminance value is subtracted from each luminance value included in the other vertical lines.

As can be seen, the influence of smear can be removed as in the image on the right half of FIG. 5 by the smear removing unit 120 subtracting the minimum luminance value from the luminance value included in each vertical line. The smear removing unit 120 removes the influence of smear on the even-numbered field image by a manner similar to that for the odd-numbered field image.

The region segmenting unit 130 acquires the data of an odd-numbered image from which smear has been removed by the smear removing unit 120 (hereinafter, simply called as the odd-numbered field image), and an even-numbered field image from which smear has been removed (hereinafter, simply called as the even-numbered field image) and segments an image into regions (a luminous region, a high-reflection region, a low-luminance region) based on the acquired odd-numbered field image and even-numbered field image.

Figure 6:
FIG. 6 is a schematic of an exemplary data structure of a region segmentation table.

Specifically, the region segmenting unit 130 holds therein a region segmentation table, and segments an image into each region by comparing the region segmentation table, the luminance value of the odd-numbered field image, and the luminance value of the even-numbered field image. FIG. 6 is a schematic of an exemplary data structure of a region segmentation table. The first to fourth thresholds depicted in FIG. 6 are assumed to be set by a manager in advance. The region segmenting unit 130 may compare the luminance value for each pixel of the odd-numbered field image and the even-numbered field image or may compare the luminance value for each predetermined region.

As depicted in FIG. 6, when the luminance value of the odd-numbered field image is larger than the first threshold and the luminance value of the even-numbered field image is larger than the second threshold, the region segmenting unit 130 determines the corresponding part (pixel) as the luminous region.

On the other hand, when the luminance value of the odd-numbered field image is smaller than the third threshold, and the luminance value of the even-numbered field image is larger than the fourth threshold, the region segmenting unit 130 determines the corresponding part (pixel) as the high-reflection region. The region segmenting unit 130 determines a part (pixel) that does not belong to either of the luminous region and the high-reflection region or a part (pixel) at which the luminance value of the odd-numbered field image is larger than the luminance value of the even-numbered field image as the low-luminance region.

The region segmenting unit 130 segments an image into the luminous region, the high-reflection region, and the low-luminance region based on the determination result, and outputs the data of the image of the luminous region, the data of the image of the high-reflection region, and the data of the image of the low-luminance region to the luminous region processing unit 140, the high-reflection region processing unit 150, and the low-luminance region processing unit 160, respectively.

The region segmenting unit 130 holds data of each sign shape, compares the sign shape and the shape of the segmented high-reflection region, and determines whether the shapes match with each other. When the shapes match, the high-reflection region is output to the high-reflection region processing unit 150 as it is as the data of the image of the high-reflection region.

On the other hand, when the shapes do not match, the region segmenting unit 130 outputs the high-reflection region whose shape does not match to the low-luminance region processing unit 160 as the data of the image of the low-luminance region.

The luminous region processing unit 140 acquires the data of the image of the luminous region from the region segmenting unit 130, and corrects the luminance value according to the luminous region. Specifically, the luminous region processing unit 140 corrects the luminance value of each pixel included in the luminous region into the luminance value of a pixel included in the even-numbered field image (or the odd-numbered field image) corresponding to the luminous region.

For example, the luminance value of a point (x, y) included in the luminous region is corrected into the luminance value of the point (x, y) of the even-numbered field image. The luminous region processing unit 140 corrects the luminance value of all the pixels included in the luminous region. The luminous region processing unit 140 outputs the data of the image of the luminous region whose luminance value has been corrected (hereinafter, a corrected luminous region image) to the synthesizing unit 170.

The high-reflection region processing unit 150 acquires the data of the image of the high-reflection region from the region segmenting unit 130, and corrects the luminance value according to the high-reflection region. Specifically, in the processing of the high-reflection region processing unit 150, the high-reflection region processing unit 150 generates a high-reflection region luminance value conversion table based on the luminance value of the high-reflection region in the odd-numbered field image.

An example of a manner of generating the high-reflection region luminance value conversion table is explained. The high-reflection region processing unit 150 detects the maximum luminance value of the luminance value included in the high-reflection region in the odd-numbered field image, and calculates a magnification B that yields the detected maximum luminance value of 255.

For example, if the maximum luminance value of the high-reflection region is C, the magnification B is calculated as follows:

$$B=255/C$$

Figure 7:
FIG. 7 is a schematic of an exemplary data structure of a high-reflection region luminance conversion table.

For simplicity, if the maximum luminance value is 100, the magnification B is 2.55, and thus the high-reflection region luminance value conversion table can be represented as in FIG. 7. FIG. 7 is a schematic of an exemplary data structure of a high-reflection region luminance value conversion table.

The high-reflection region processing unit 150 compares the luminance value included in the high-reflection region of the odd-numbered field image and the input luminance value of the high-reflection region luminance value conversion table, and corrects the luminance value of the pixel so that the luminance value becomes the corrected luminance value (output luminance value). For example, when the luminance value is 2, the corrected luminance value is set to 5.1 (see FIG. 7). The high-reflection region processing unit 150 corrects the luminance value of all the pixels included in the high-reflection region. The high-reflection region processing unit 150 outputs the data of the image of the high-reflection region whose luminance value has been corrected (hereinafter, a corrected high-reflection region image) to the synthesizing unit 170.

The low-luminance region processing unit 160 acquires the data of the image of the low-luminance region from the region segmenting unit 130, and corrects the luminance value according to the low-luminance region. Specifically, in the processing of the low-luminance region processing unit 160, the low-luminance region processing unit 160 generates a low-luminance region conversion table based on the luminance value of the low-luminance region in the even-numbered field image.

An example of a manner of generating the low-luminance region conversion table is explained. The low-luminance region processing unit 160 detects the maximum luminance value of the luminance value included in the low-luminance region in the even-numbered field image, and calculates a magnification D that yields the detected luminance value of 255.

For example, if the maximum luminance value of the low-luminance region is E, the magnification D is calculated as follows:

$$D=255/E$$

Figure 8:
FIG. 8 is a schematic of an exemplary data structure of a low-luminance region conversion table.

For simplicity, if the maximum luminance value is 80, the magnification D is 3.19, thus the low-luminance region conversion table can be represented as in FIG. 8. FIG. 8 is a schematic of an exemplary data structure of a low-luminance region conversion table.

The low-luminance region processing unit 160 compares the luminance value included in the low-luminance region of the even-numbered field image and the input luminance value of the low-luminance region conversion table with each other, and corrects the luminance value of the pixel so that the luminance value becomes the corrected luminance value (output luminance value). For example, when the luminance value is 2, the corrected luminance value is set as 6.38 (see FIG. 8). The low-luminance region processing unit 160 outputs the data of the image of the low-luminance region whose luminance value has been corrected (hereinafter, a corrected low-reflection region image) to the synthesizing unit 170.

The synthesizing unit 170 acquires data of a corrected luminous region image from the luminous region processing unit 140, data of a high-reflection region image from the high-reflection region processing unit 150, and data of a corrected low-luminance region image from the low-luminance region processing unit 160, and synthesizes the acquired images. The synthesizing unit 170 outputs the data of the synthesized image to the display 30 as a night vision image.

Figure 9A:
FIG. 9A is an example of a night vision image according to the present manner.
Figure 9B:
FIG. 9B is an example of a night vision image according to a conventional manner.

FIG. 9A is an example of a night vision image according to the present manner and FIG. 9B is an example of a night vision image according to a conventional manner. As depicted in the figure, the night vision image according to the present manner is less influenced by smear, and can enhance the visibility of a high-reflection region, as compared with the conventional night vision image.

Figure 10:
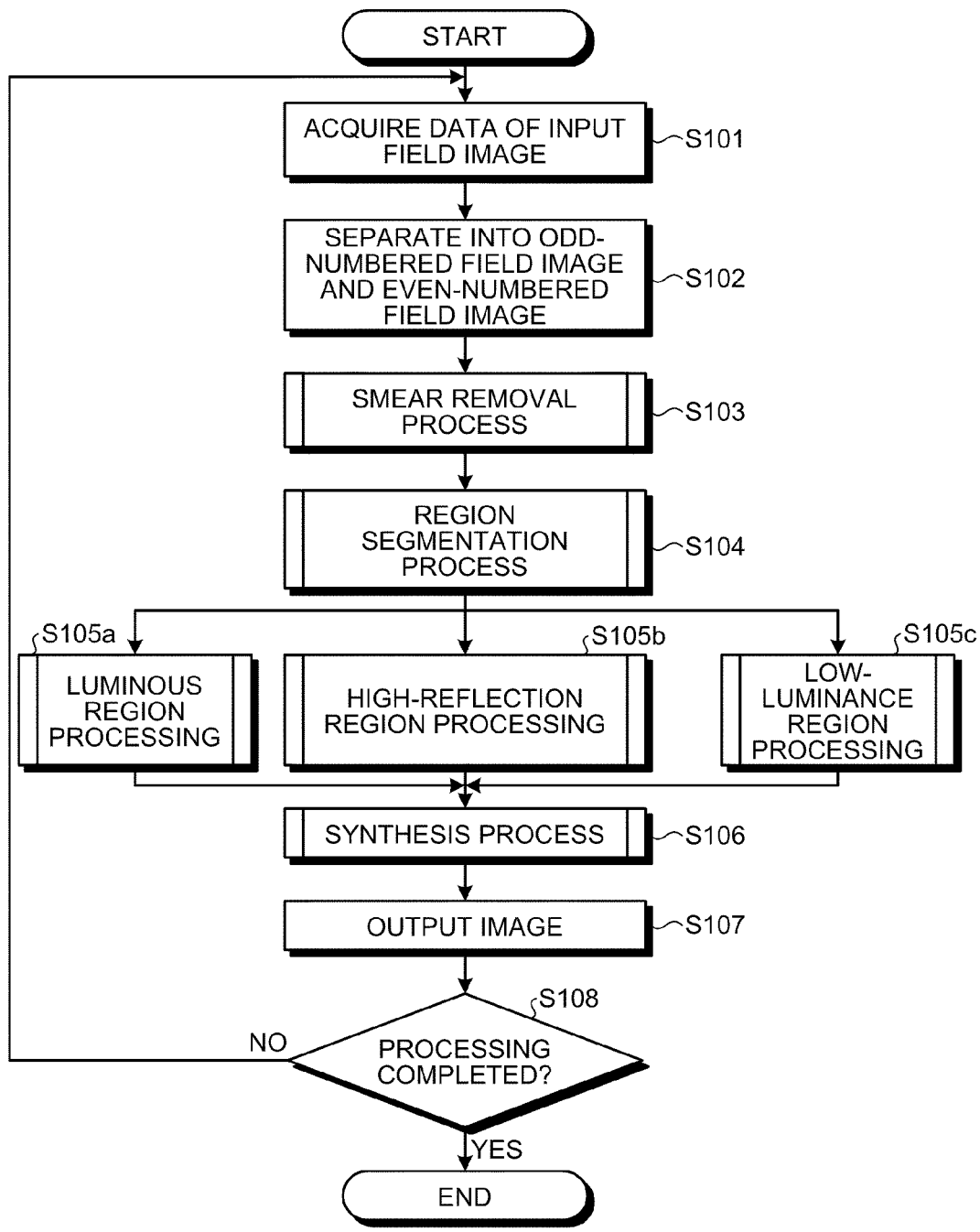
FIG. 10 is a flowchart of a procedure of the night vision image processing unit according to the first embodiment.

A procedure of the night vision image processing unit 100 according to the first embodiment is explained. FIG. 10 is a flowchart of a procedure of the night vision image processing unit 100 according to the first embodiment. As depicted in the figure, in the night vision image processing unit 100, the field separating unit 110 acquires data of an input field image (Step S101), and separates the input field image into an odd-numbered field image and an even-numbered field image (Step S102).

The smear removing unit 120 executes smear removal to remove smear of the odd-numbered field image and the even-numbered field image (Step S103), and the region segmenting unit 130 segments the image into a luminous region, a high-reflection region, and a low-luminance region (Step S104).

The luminous region processing unit 140 executes luminous region processing (Step S105a), the high-reflection region processing unit 150 executes high-reflection region processing (Step S105b), and the low-luminance region processing unit 160 executes low-luminance region processing (Step S105c).

The synthesizing unit 170 acquires data of a corrected luminous region image from the luminous region processing unit 140, data of a corrected high-reflection region image from the high-reflection region processing unit 150, and data of a corrected low-luminance region image from the low-luminance region processing unit 160 to synthesize the images (Step S106), and outputs the image to the display 30 (Step S107).

When the night vision image processing unit 100 continues the process (NO at Step S108), the process proceeds to Step S101, and when the night vision image processing unit 100 ends the process (YES at Step S108), the process ends.

Figure 11:
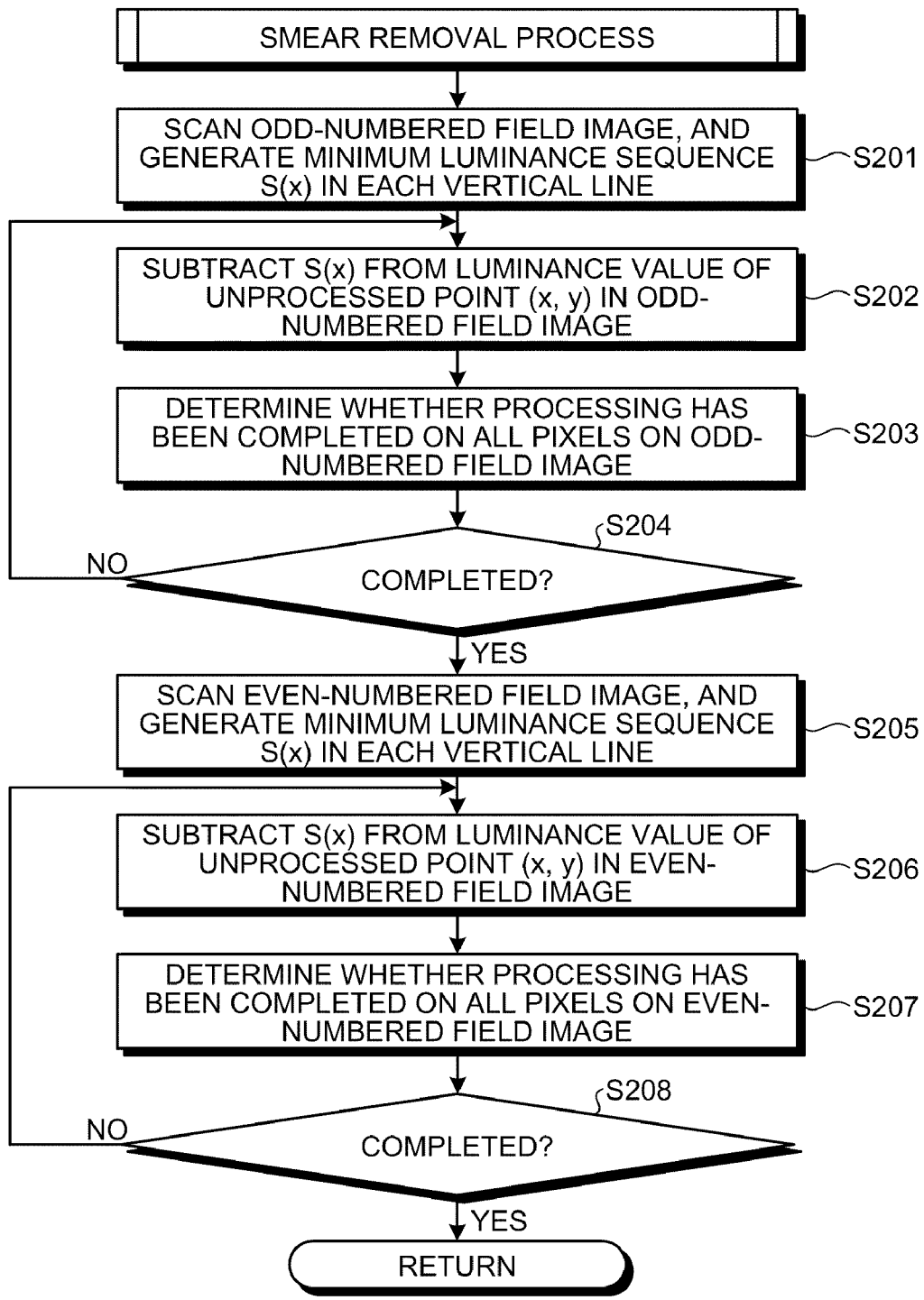
FIG. 11 is a flowchart of a procedure of smear removal.

The smear removal depicted as Step S103 of FIG. 10 is explained. FIG. 11 is a flowchart of a procedure of the smear removal. As depicted in the figure, the smear removing unit 120 scans an odd-numbered field image, generates the minimum luminance sequence S(x) in each vertical line (Step S201), and subtracts S(x) from the luminance value of an unprocessed point (x, y) of the odd-numbered field image (Step S202).

The smear removing unit 120 determines whether the processing has been completed on all the pixels in the odd-numbered field image (Step S203), and if not (NO at Step S204), the process proceeds to Step S202.

On the other hand, when the processing has been completed (YES at Step S204), the smear removing unit 120 scans the even-numbered field image, generates the minimum luminance sequence S(x) in each vertical line (Step S205), and subtracts S(x) from the luminance value of an unprocessed point (x, y) in the even-numbered field image (Step S206).

The smear removing unit 120 determines whether the processing has been completed on all the pixels in the even-numbered field image (Step S207), and if not (NO at Step S208), the process proceeds to Step S206, and if the processing has been completed (YES at Step S208), the smear removal ends.

As can be seen, because the smear removing unit 120 removes smear present on the odd-numbered field image and the even-numbered field image, the luminance value of each region can be corrected more precisely, and visibility of a night vision image can be enhanced.

Figure 12:
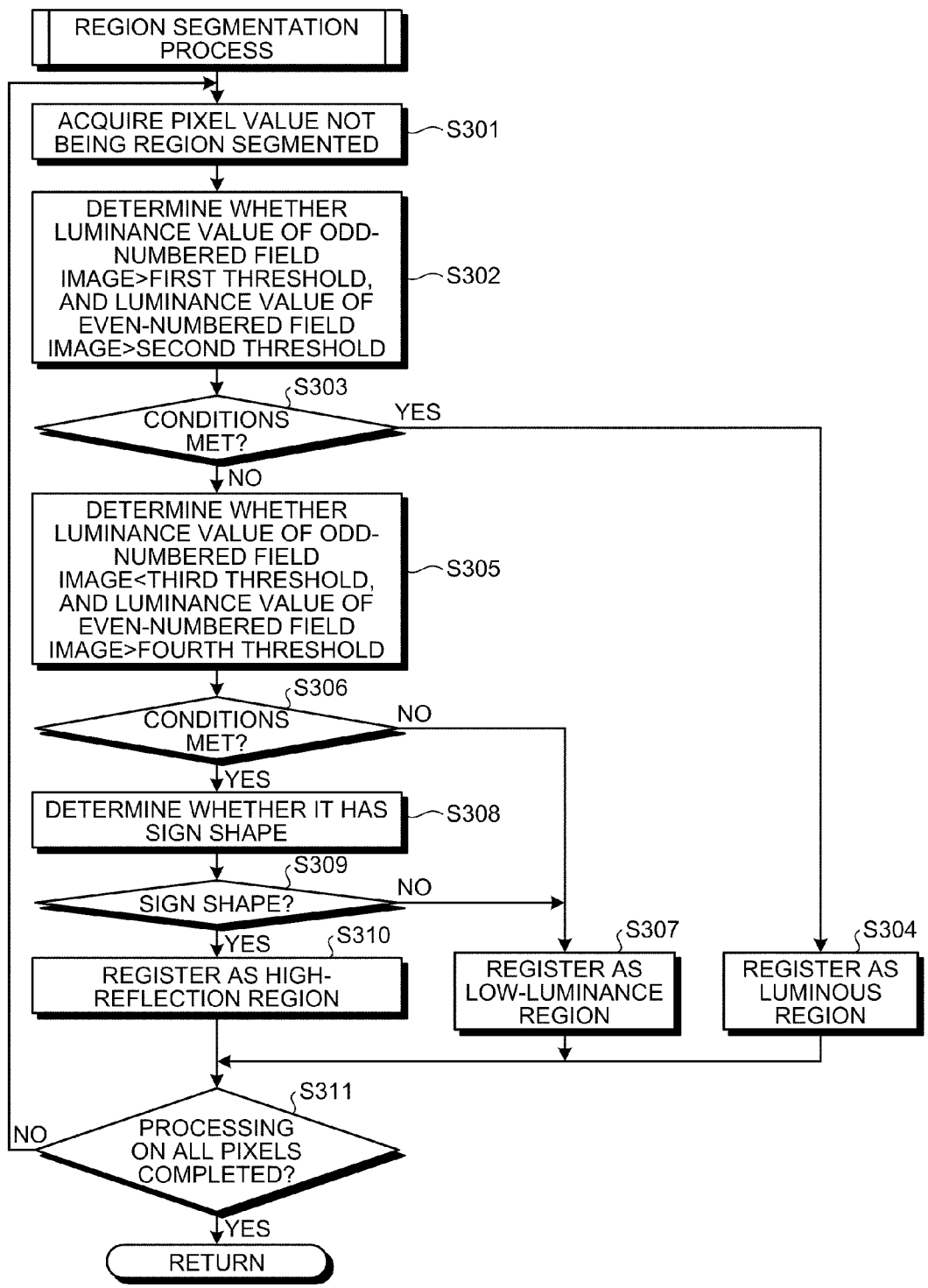
FIG. 12 is a flowchart of a procedure of region segmentation.

The region segmentation depicted as Step S104 of FIG. 10 is explained. FIG. 12 is a flowchart of a procedure of the region segmentation. As depicted in the figure, the region segmenting unit 130 acquires the value of a pixel not subjected to region segmentation (Step S301), and determines whether the luminance value of the odd-numbered field image is larger than the first threshold, and the luminance value of the even-numbered field image is larger than the second threshold (Step S302). If the conditions are met (YES at Step S303), the region segmenting unit 130 registers the pixel as a luminous region (Step S304), and the process proceeds to Step S311.

On the other hand, if the conditions are not met (NO at Step S303), the region segmenting unit 130 determines whether the luminance value of the odd-numbered field image is smaller than the third threshold and the luminance value of the even-numbered field image is larger than the fourth threshold (Step S305). If the conditions are not met (NO at Step S306), the region segmenting unit 130 registers the pixel as the low-luminance region (Step S307), and the process proceeds to Step S311.

On the other hand, if the conditions are met (YES at Step S306), the region segmenting unit 130 determines whether a region that is segmented by the pixel of the subject to be determined has a sign shape (Step S308), and if not a sign shape (NO at Step S309), the process proceeds to Step S307.

On the other hand, if the region has a sign shape (YES at Step S309), the region segmenting unit 130 registers the pixel as the high-reflection region (Step S310). When the processing has not been completed on all the pixels (NO Step S311), the process proceeds to Step S301, and when the processing has been completed (YES at Step S311), the region segmentation ends.

Figure 13:
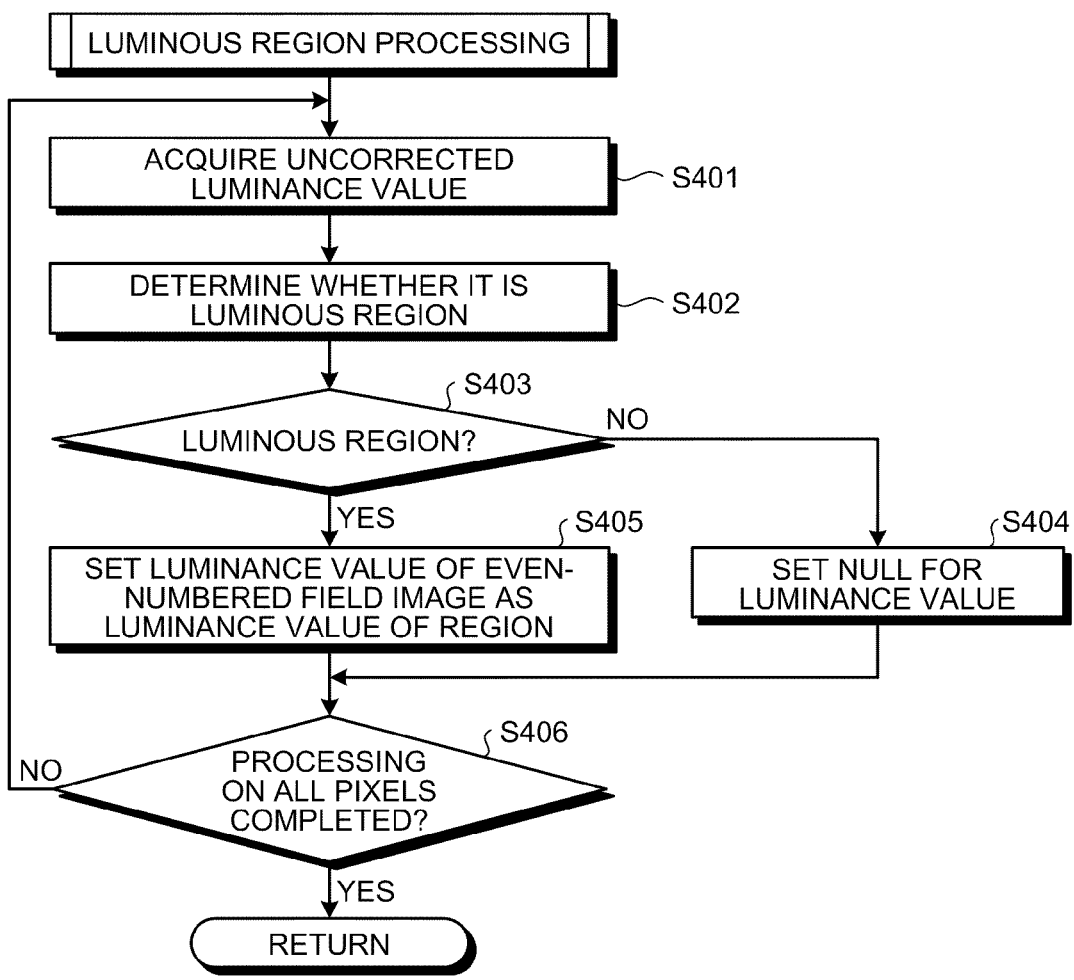
FIG. 13 is a flowchart of a procedure of luminous region processing.

The luminous region processing depicted as Step S105a of FIG. 10 is explained. FIG. 13 is a flowchart of a procedure of the luminous region processing. As depicted in the figure, the luminous region processing unit 140 acquires an uncorrected luminance value (a pixel value) (Step S401), and determines whether it is a luminous region (Step S402).

When it is not a luminous region (NO at Step S403), a null is set for the luminance value (Step S404), and the process proceeds to Step S406. On the other hand, when it is a luminous region (YES at Step S403), the luminance value of the even-numbered field image is set to the luminance value of the region (Step S405).

The luminous region processing unit 140 determines whether the processing has been completed on all the pixels, and if not (NO at Step S406), the process proceeds to Step S401, and if the processing has been completed (YES Step S406), the luminous region processing ends.

As can be seen, because the luminous region processing unit 140 replaces the luminance value of the luminous region with the luminance value of the even-numbered field image (maximum luminance value), the headlight of an opposing vehicle and the like can be displayed on a night vision image accurately.

Figure 14:
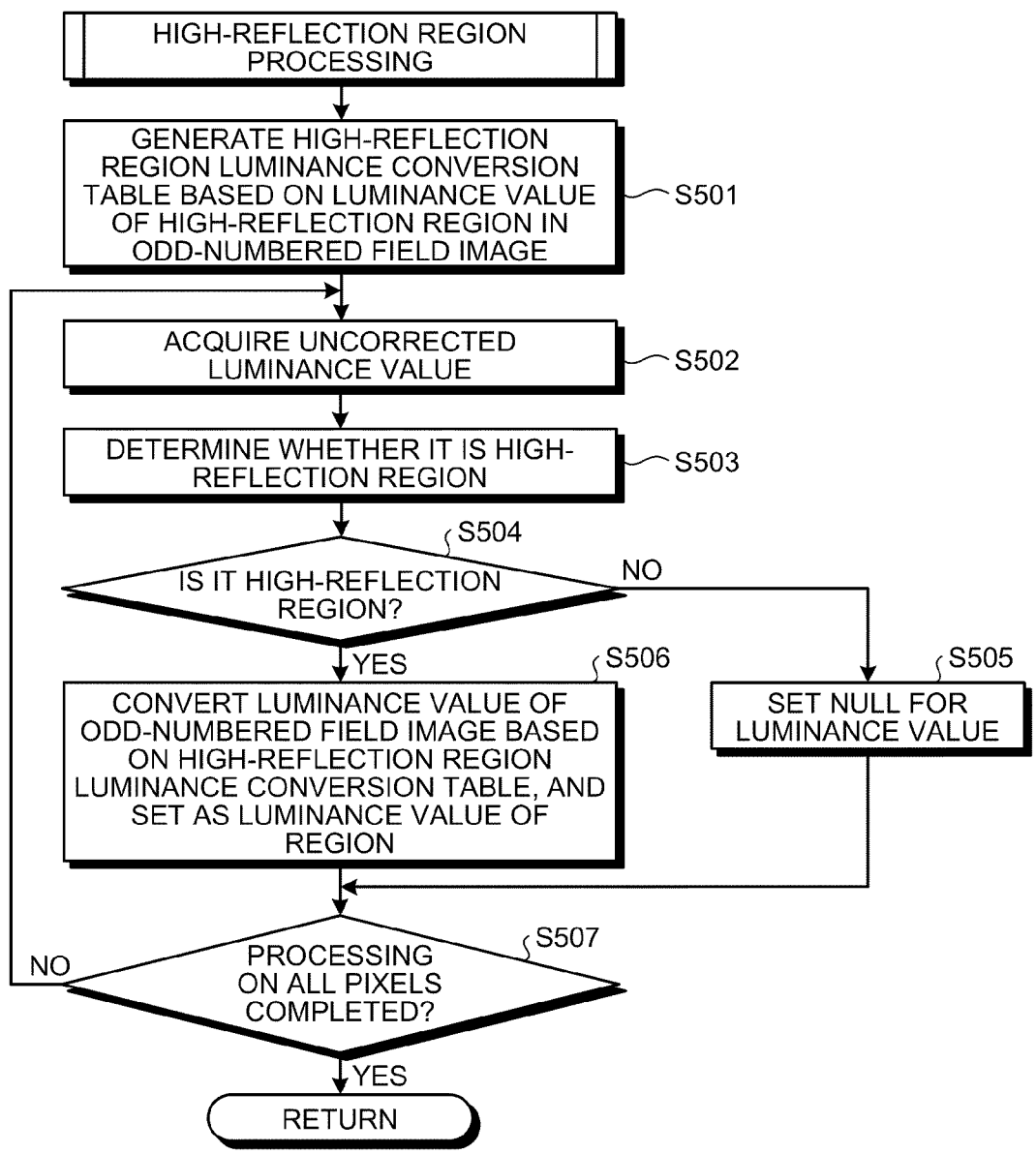
FIG. 14 is a flowchart of a procedure of high-reflection region processing.

The high-reflection region processing depicted as Step S105b of FIG. 10 is explained. FIG. 14 is a flowchart of a procedure of the high-reflection region processing. As depicted in the figure, the high-reflection region processing unit 150 generates a high-reflection region luminance value conversion table based on the luminance value of a high-reflection region in an odd-numbered field image (Step S501), and acquires an uncorrected luminance value (Step S502).

The high-reflection region processing unit 150 determines whether it is a high-reflection region (Step S503), and if not (NO at Step S504), a null is set for the luminance value (Step S505), and the process proceeds to Step S507.

On the other hand, if it is a high-reflection region (YES at Step S504), the luminance value of the odd-numbered field image is converted based on the high-reflection region luminance value conversion table, and the luminance value of the region is set (Step S506).

The high-reflection region processing unit 150 determines whether the processing has been completed on all the pixels, and if not (NO at Step S507), the process proceeds to Step S502, and if the processing has been completed (YES at Step S507), the high-reflection region processing ends.

As can be seen, because the high-reflection region processing unit 150 corrects the luminance value of a high-reflection region of an image based on a high-reflection region luminance value conversion table, visibility of a road sign or the like generated by a recursive reflection material can be enhanced.

Figure 15:
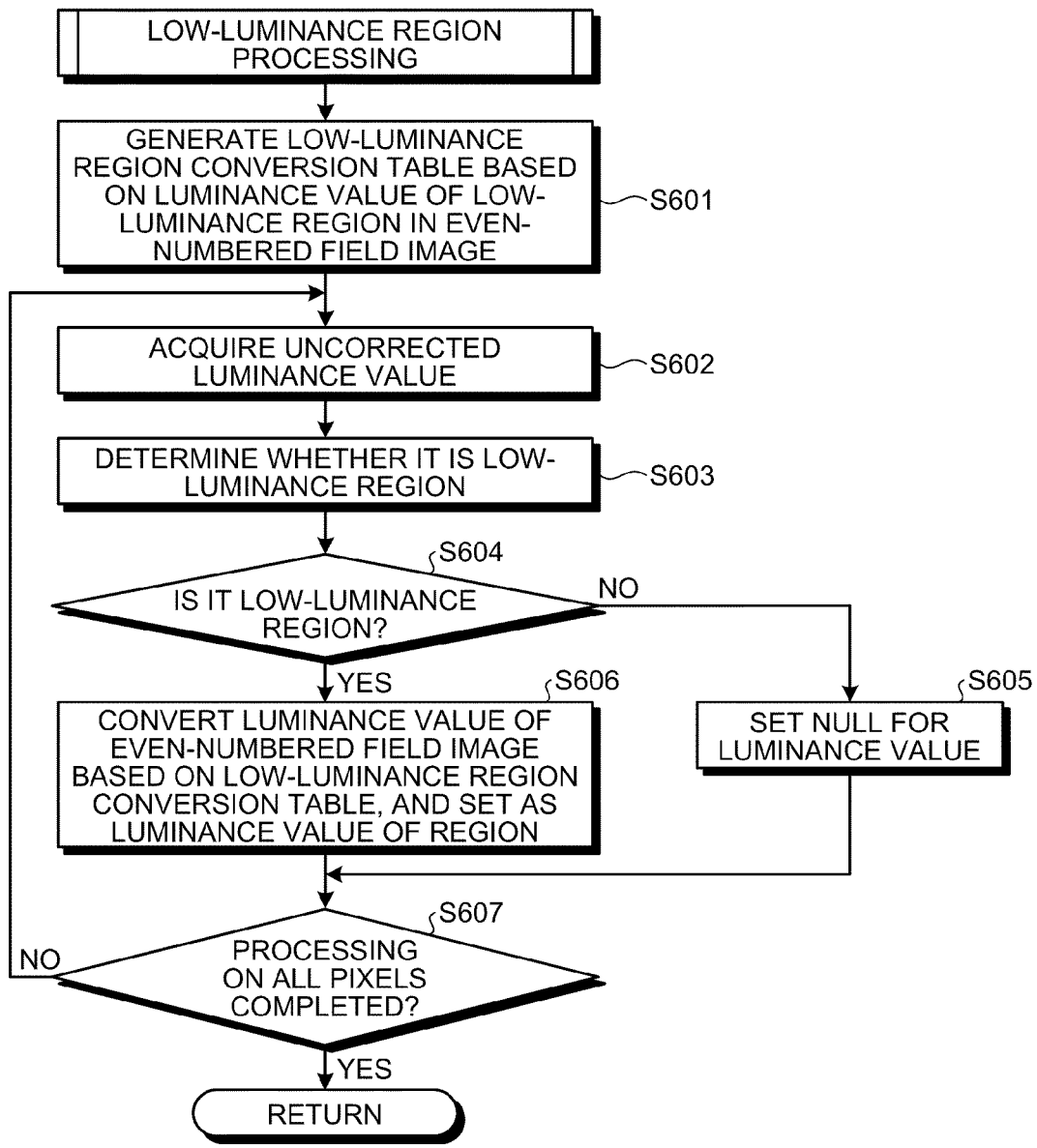
FIG. 15 is a flowchart of a procedure of low-luminance region processing.

The low-luminance region processing depicted as Step S105c of FIG. 10 is explained. FIG. 15 is a flowchart of a procedure of the low-luminance region processing. As depicted in the figure, the low-luminance region processing unit 160 generates a low-luminance region conversion table based on the luminance value of a low-luminance region in the even-numbered field image (Step S601), and acquires an uncorrected luminance value (Step S602).

The low-luminance region processing unit 160 determines whether it is a low-luminance region (Step S603), and if not (NO at Step S604), the low-luminance region processing unit 160 sets a null for the pixel (Step S605), and the process proceeds to Step S607.

On the other hand, if it is a low-luminance region (YES at Step S604), the low-luminance region processing unit 160 converts the luminance value of the even-numbered field image based on the low-luminance region conversion table, and sets the luminance value of the region (Step S606).

The low-luminance region processing unit 160 determines whether the processing has been completed on all the pixels, and if not (NO at Step S607), the process proceeds to Step S602, and if the processing has been completed (YES at Step S607), the low-luminance region processing ends.

As can be seen, because the low-luminance region processing unit 160 corrects the luminance value of a low-luminance region of an image based on a low-luminance region luminance value conversion table, visibility of an image of the low-luminance region can be enhanced.

Figure 16:
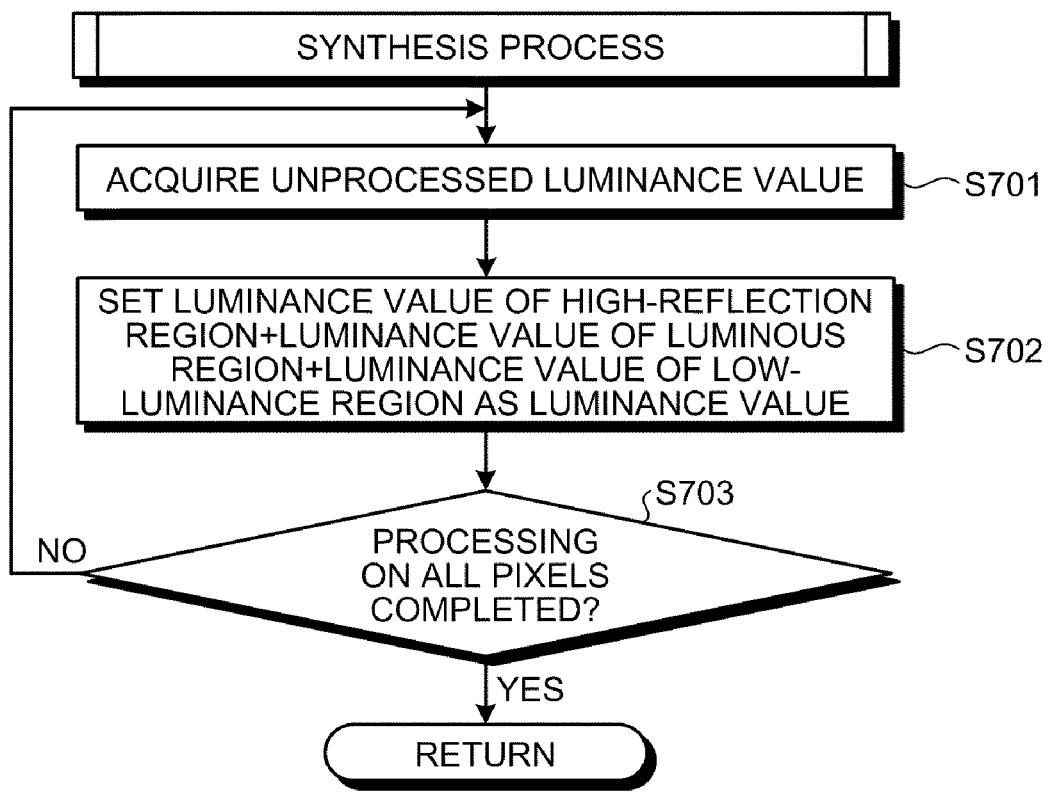
FIG. 16 is a flowchart of a procedure of synthesis.

The synthesis process depicted as Step S106 of FIG. 10 is explained. FIG. 16 is a flowchart of a procedure of the synthesis process. As depicted in the figure, the synthesizing unit 170 acquires an unprocessed luminance value (Step S701), and sets the acquired luminance value as the luminance value obtained by adding the luminance value of the high-reflection region, the luminance value of the luminous region, and the luminance value of the low-luminance region (Step S702).

The synthesizing unit 170 determines whether the processing has been completed on all the pixels, and if not (NO at Step S703), the processing proceeds to Step S701, and if the processing has been completed (YES at Step S703), the synthesis process ends.

As has been described, the night vision image processing unit 100 (the night vision apparatus) according to the first embodiment separates an input field image acquired from the near-infrared camera 70 into an odd-numbered field image and an even-numbered field image, and segments the image into regions (a luminous region, a high-reflection region, a low-luminance region) based on the luminance value of each pixel included in the odd-numbered field image and the even-numbered field image. Because the night vision image processing unit 100 corrects the luminance value of each region according to characteristics of the region, visibility of a night vision image can be enhanced.

When correcting the luminance value of a high-reflection region, the high-reflection region processing unit 150 depicted in FIG. 4 may implement luminance value correction such as gamma correction based on an odd-numbered field image. When correcting luminance value of a low-luminance region, the low-luminance region processing unit 160 may implement luminance value correction such as gamma correction based on an even-numbered field image.

[b] Second Embodiment

An outline and characteristics of the night vision apparatus according to a second embodiment are explained. The night vision apparatus according to the second embodiment corrects the luminance value of each region (a luminous region, a high-reflection region, a low-luminance region) by a manner similar to that depicted in the first embodiment, and displays the luminous region and the high-reflection region with colors by using a color image imaged by a color camera.

As can be seen, because the night vision apparatus according to the second embodiment displays a luminous region and a high-reflection region in a night vision image with colors, visibility can be further enhanced.

Figure 17:
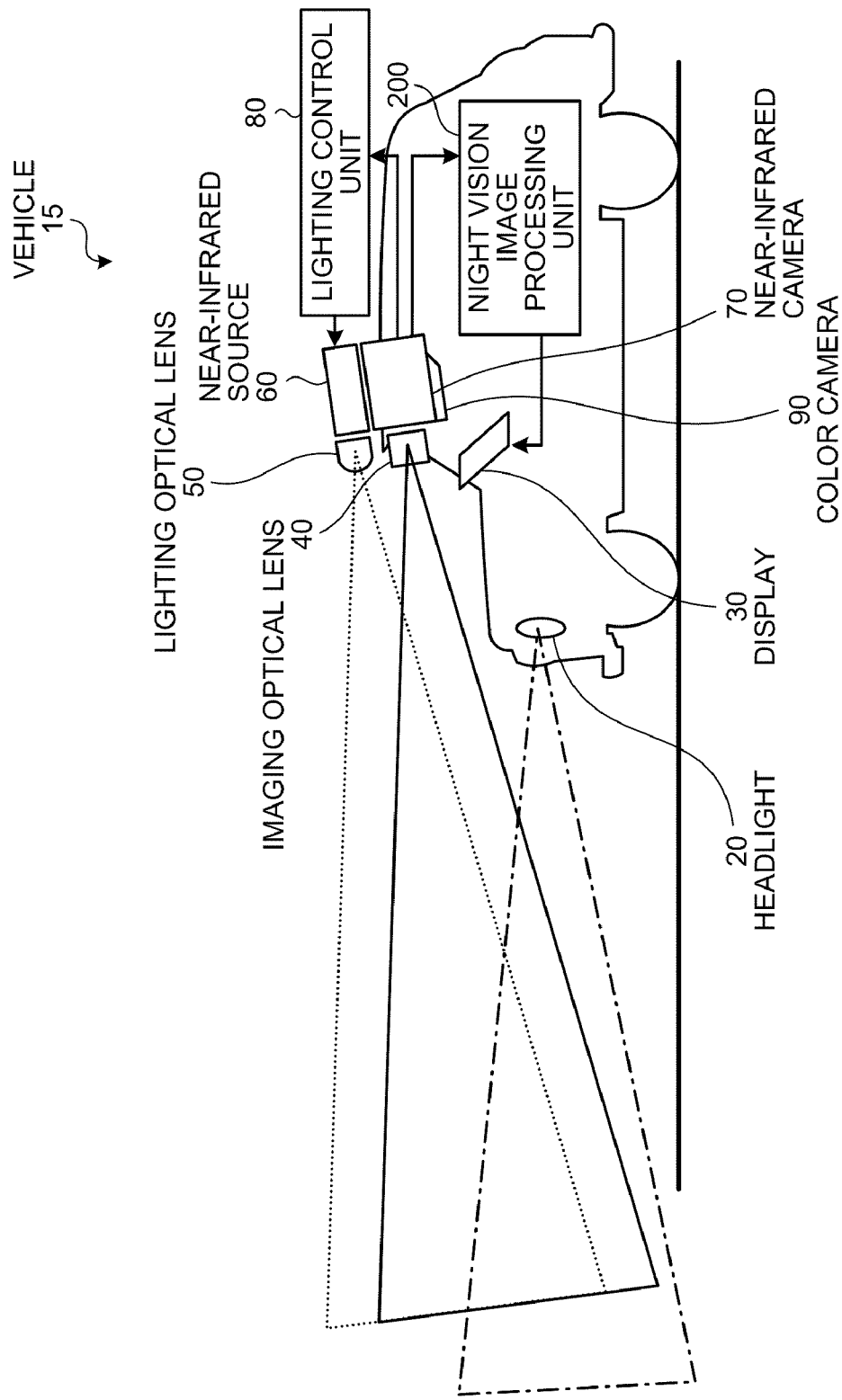
FIG. 17 is a schematic of a configuration of a vehicle on which a night vision apparatus according to a second embodiment is mounted.

An exemplary configuration of a vehicle on which the night vision apparatus according to the second embodiment is mounted is explained. FIG. 17 is a schematic of a configuration of a vehicle on which the night vision apparatus according to the second embodiment is mounted. As depicted in the figure, a vehicle 15 includes the headlight 20, the display 30, the imaging optical lens 40, the lighting optical lens 50, the near-infrared source 60, the near-infrared camera 70, the lighting control unit 80, a color camera 90, and a night vision image processing unit 200.

Because among them, the headlight 20, the display 30, the imaging optical lens 40, the lighting optical lens 50, the near-infrared source 60, the near-infrared camera 70, and the lighting control unit 80 are similar to the headlight 20, the display 30, the imaging optical lens 40, the lighting optical lens 50, the near-infrared source 60, the near-infrared camera 70, and the lighting control unit 80 depicted in FIG. 2, the explanation is not repeated.

Figure 18:
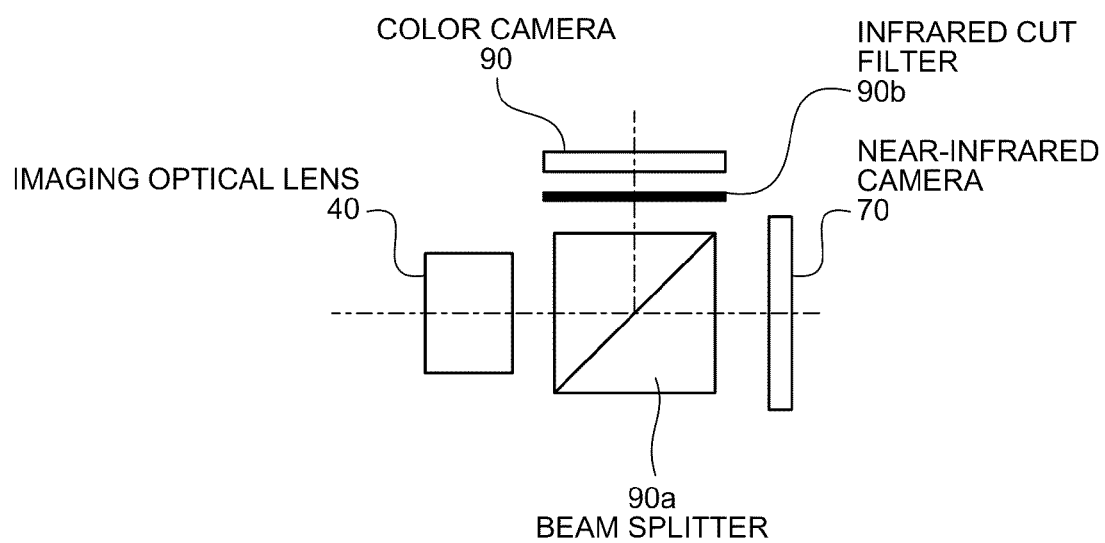
FIG. 18 is a schematic of an exemplary configuration of a color camera having an imaging area same as that of a near-infrared camera.

The color camera 90 is a visible light camera in which an imaging area same as that of the near-infrared camera 70 is set. FIG. 18 is a schematic of an exemplary configuration of the color camera having an imaging area same as that of the near-infrared camera.

As depicted in FIG. 18, light incident from the imaging optical lens 40 is split by a beam splitter 90a, and is output to the near-infrared camera 70 and the color camera 90 (the color camera 90 through an infrared cut filter 90b). As depicted in FIG. 18, by configuring the near-infrared camera 70 and the color camera 90, the imaging area can be made the same as that of the near-infrared camera.

The night vision image processing unit 200 corrects luminance value of each region (a luminous region, a high-reflection region, a low-luminance region) by a manner similar to that depicted in the first embodiment, and displays the luminous region and the high-reflection region with colors on the display 30 by using a color image imaged by the color camera 90.

Figure 19:
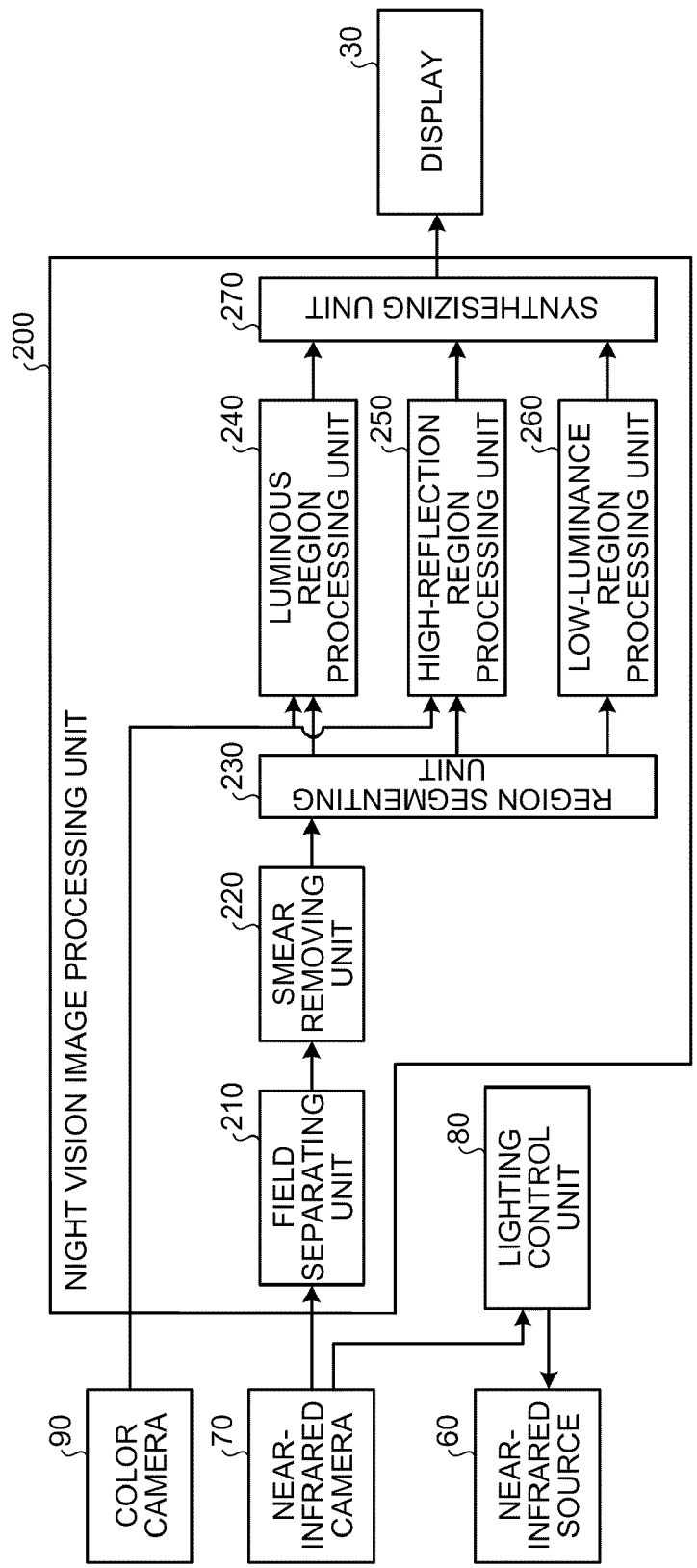
FIG. 19 is a functional block diagram of a configuration of the night vision image processing unit according to the second embodiment.

A configuration of the night vision image processing unit 200 according to the second embodiment is explained. FIG. 19 is a functional block diagram of a configuration of the night vision image processing unit 200 according to the second embodiment. As depicted in the figure, the night vision image processing unit 200 includes a field separating unit 210, a smear removing unit 220, a region segmenting unit 230, a luminous region processing unit 240, a high-reflection region processing unit 250, a low-luminance region processing unit 260, and a synthesizing unit 270.

Because the details of the processing performed by the field separating unit 210, the smear removing unit 220, the region segmenting unit 230, the low-luminance region processing unit 260, and the synthesizing unit 270 are the same as those performed by the field separating unit 110, the smear removing unit 120, the region segmenting unit 130, the low-luminance region processing unit 160, and the synthesizing unit 170 explained referring to FIG. 4, the explanation is not repeated.

The luminous region processing unit 240 acquires data of a color image from the color camera 90, acquires data of an image of a luminous region from the region segmenting unit 230, and corrects the luminance value according to the luminous region. Specifically, the luminous region processing unit 240 replaces the pixel values and luminance values included in a luminous region with the pixel values and luminance values of a color image corresponding to the luminous region.

For example, the pixel value and luminance value of a point (x, y) included in a luminous region are replaced with the pixel value and luminance value of a point (x, y) of a color image. The luminous region processing unit 240 corrects (replaces) all the pixels included in a luminous region. The luminous region processing unit 240 outputs data of an image of a luminous region whose luminance value has been corrected to the synthesizing unit 270.

The high-reflection region processing unit 250 acquires data of a color image from the color camera 90, acquires data of an image of a high-reflection region from the region segmenting unit 230, and corrects the luminance value according to the high-reflection region. Specifically, in the processing by the high-reflection region processing unit 250, a high-reflection region luminance value conversion table is generated based on the luminance value of a high-reflection region in a color image. The manner of generating the high-reflection region luminance value conversion table is similar to that in the first embodiment. The data structure of the high-reflection region luminance value conversion table is also similar (see FIG. 7).

The high-reflection region processing unit 250 compares the luminance value included in the high-reflection region in the color image and input luminance value of the high-reflection region luminance value conversion table, and corrects the luminance value of the pixel of the color image so that it becomes the corrected luminance value (output luminance value). The high-reflection region processing unit 250 outputs data of an image of the high-reflection region whose luminance value has been corrected to the synthesizing unit 270.

Figure 20:
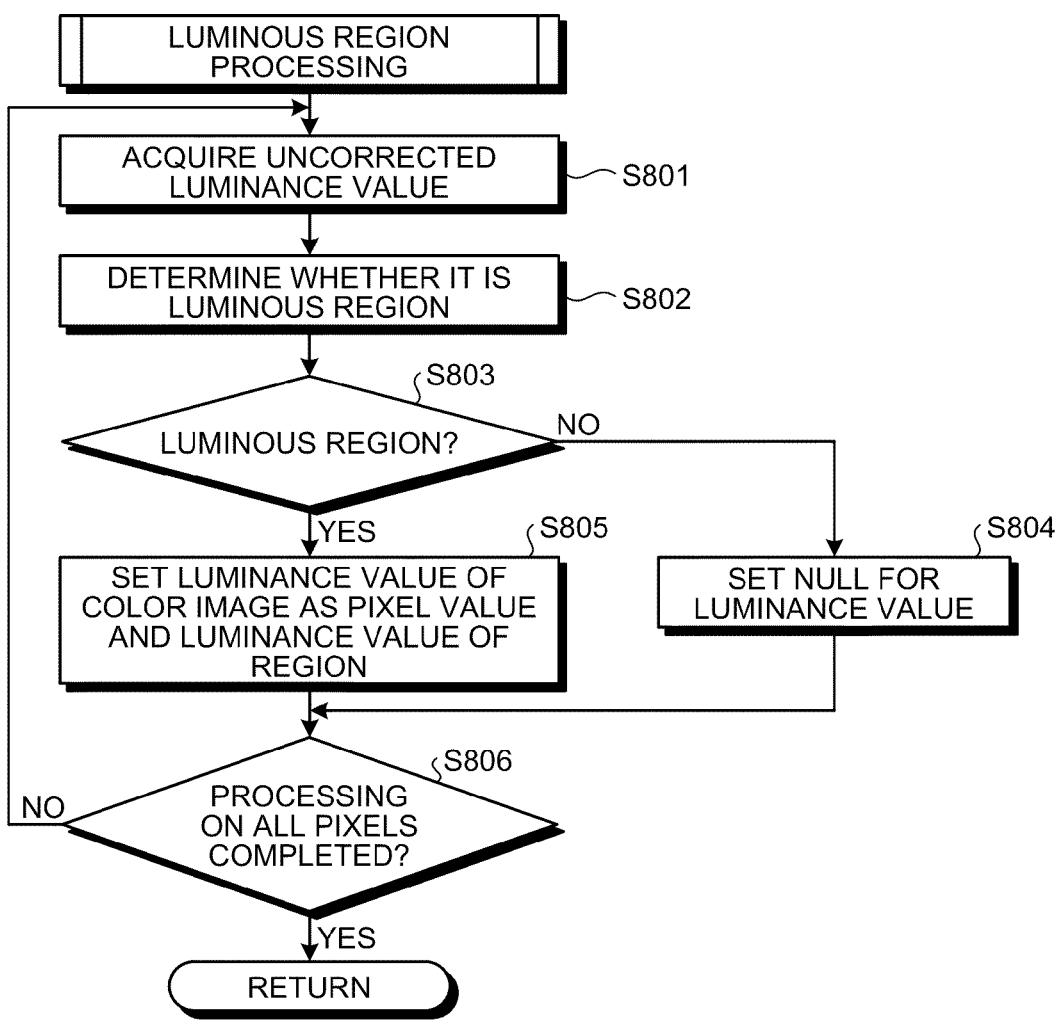
FIG. 20 is a flowchart of a procedure of luminous region processing according to the second embodiment.

A procedure of the night vision image processing unit 200 according to the second embodiment is explained. The luminous region processing and the high-reflection region processing that are different from those of the night vision image processing unit 100 depicted in the first embodiment are explained. The luminous region processing is explained. FIG. 20 is a flowchart of a procedure of the luminous region processing according to the second embodiment.

As depicted in FIG. 20, the luminous region processing unit 240 acquires an uncorrected luminance value (Step S801), and determines whether it is a luminous region (Step S802). When it is not a luminous region (NO at Step S803), the luminous region processing unit 240 sets a null for the luminance value (Step S804), and the process proceeds to Step S806.

On the other hand, when it is a luminous region (YES at Step S803), the luminous region processing unit 240 sets the pixel value and luminance value of a color image as the pixel value and luminance value of a luminous region (Step S805). The luminous region processing unit 240 determines whether the processing has been completed on all the pixels, and if not (NO at Step S806), the process proceeds to Step S801, and if the processing has been completed (YES at Step S806), the luminous region processing ends.

Figure 21:
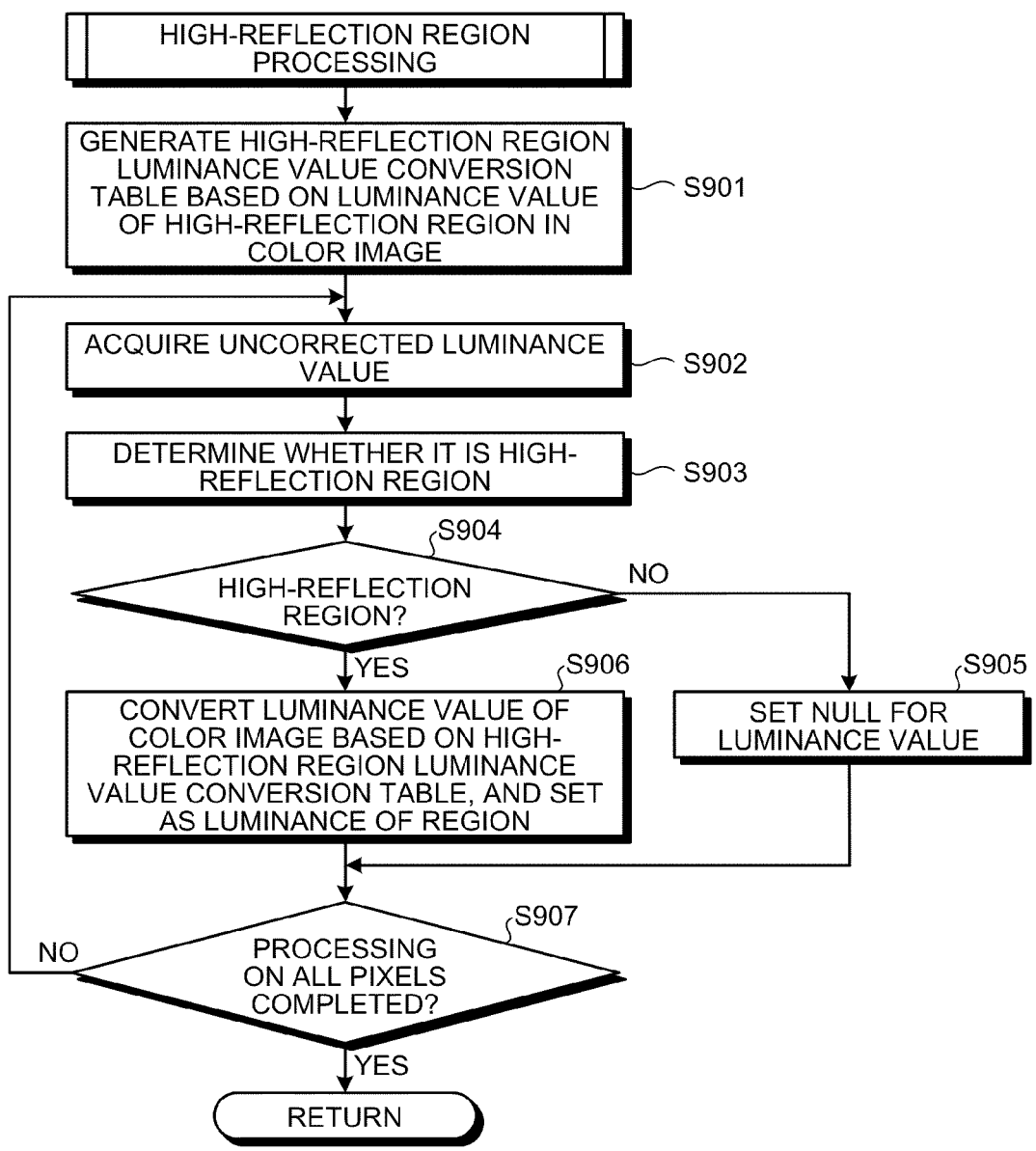
FIG. 21 is a flowchart of a procedure of high-reflection region processing according to the second embodiment.

The high-reflection region processing is explained. FIG. 21 is a flowchart of a procedure of the high-reflection region processing according to the second embodiment. As depicted in the figure, the high-reflection region processing unit 250 generates a high-reflection region luminance value conversion table based on luminance value of a high-reflection region in a color image (Step S901), and acquires an uncorrected luminance value (Step S902).

The high-reflection region processing unit 250 determines whether the acquired luminance value is the luminance value of a high-reflection region (Step S903), and if not (NO at Step S904), the high-reflection region processing unit 250 sets a null for the luminance value (Step S905), and the process proceeds to Step S907.

On the other hand, when it is a high-reflection region (YES at Step S904), the high-reflection region processing unit 250 converts the luminance value of the color image based on the high-reflection region luminance value conversion table, and sets the luminance value as the luminance value of the region (Step S906). The high-reflection region processing unit 250 determines whether the processing has been completed on all the pixels, and if not (NO at Step S907), the process proceeds to Step S902, and if the processing has not been completed (YES at Step S907), the high-reflection region processing ends.

As has been described, because the night vision image processing unit 200 according to the second embodiment segments an image into regions (a luminous region, a high-reflection region, a low-luminance region), corrects the luminance value of the luminous region and the high-reflection region by using a color image imaged by the color camera 90, and displays the luminous region and the high-reflection region with colors, visibility can be further enhanced.

A part or all of the processing in the present embodiment explained to be performed automatically may be performed manually, and a part or all of the processing explained to be performed manually may be performed automatically by a known method. In addition, the processing procedure, the control procedure, the specific names, and the information including various types of data and parameters depicted above or in the figures may be changed optionally unless otherwise noted.

The configurations of the night vision image processing units 100, 200 depicted in FIGS. 4 and 19 are functional and conceptual, and are not required to be configured physically as depicted. In other words, the specific modes of dispersion/integration of each device are not limited to those depicted in the figures, but all or a part of them may be dispersed/integrated functionally or physically in an optional unit according to various loads or usage. Furthermore, all or a part of the processing functions performed by each device may be realized by a central processing unit (CPU) (or memory control unit (MCU) or micro processing unit (MPU)), and a computer program analyzed and executed by the CPU, or alternatively realized as hardware by wired logic.

Figure 22:
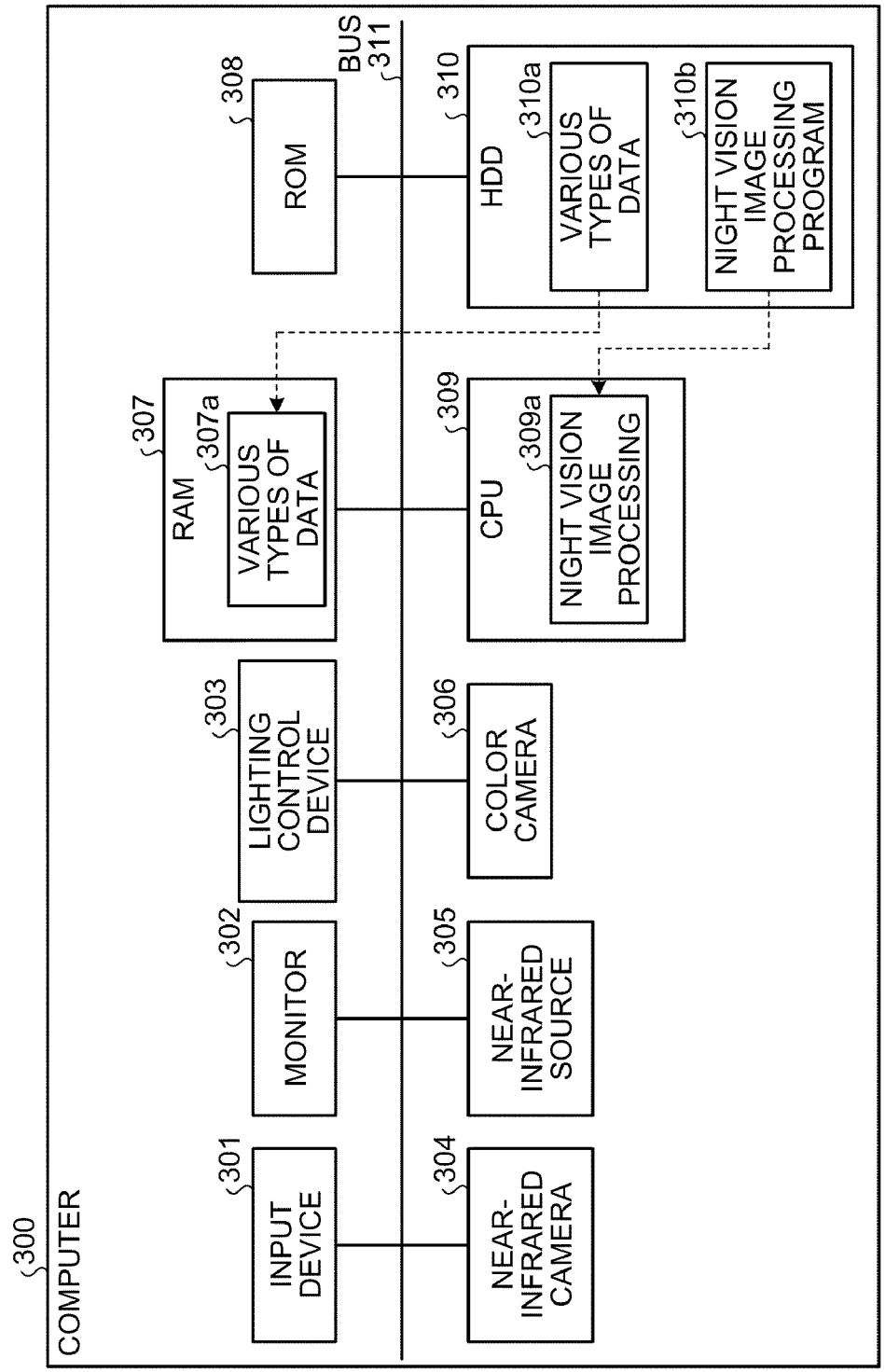
FIG. 22 is a schematic of a hardware configuration of a computer of the night vision image processing unit depicted in FIG. 4.

FIG. 22 is a schematic of a hardware configuration of a computer of the night vision image processing unit 100 depicted in FIG. 4 (or the night vision image processing unit 200 depicted in FIG. 19). This computer 300 includes an input device 301 that receives an input of data from a user, a monitor 302, a lighting control device 303, a near-infrared camera 304, a near-infrared source 305, a color camera 306, a random access memory (RAM) 307, a read only memory (ROM) 308, a CPU 309, and a hard disk drive (HDD) 310, all of which are connected by a bus 311.

The lighting control device 303, the near-infrared camera 304, the near-infrared source 305, and the color camera 306 correspond to the lighting control unit 80, the near-infrared camera 70, and the near-infrared source 60 depicted in FIG. 4, and the color camera 90 depicted in FIG. 19, respectively.

The HDD 310 may function a computer readable storage medium and stores therein a night vision image processing program 310b that exhibits a function similar to that of the night vision image processing unit 100 (200). When the CPU 309 reads out the night vision image processing program 310b from the HDD 310, and executes it, a night vision image processing 309a that realizes the functions of the functional units of the night vision image processing unit 100 (200) is activated. The night vision image processing 309a corresponds to the field separating unit 110, the smear removing unit 120, the region segmenting unit 130, the luminous region processing unit 140, the high-reflection region processing unit 150, the low-luminance region processing unit 160, and the synthesizing unit 170 depicted in FIG. 4.

The HDD 310 stores therein various types of data 310a corresponding to data stored in the night vision image processing unit 100. The various types of data 310a correspond to a region segmentation table (see FIG. 6) or the like.

The CPU 309 stores the various types of data 310a in the HDD 310, and reads out the various types of data 310a from the HDD 310, and stores the data in the RAM 307, and executes the night vision image processing by using various types of data 307a stored in the RAM 307.

According to an embodiment of the invention, visibility of a night vision image can be enhanced irrespective of characteristics of a subject because an imaged image is segmented into a plurality of regions based on the luminance value of a lighting image that represents an image taken when infrared light is emitted and the luminance value of a non-lighting image that represents an image taken when infrared light is not emitted, and the luminance value of each segmented region is corrected based on the characteristics of the region.

According to an embodiment of the invention, the luminance value of a luminous region can be corrected appropriately because a region in an image whose luminance value of a non-lighting image is larger than a first threshold, and whose luminance value of a lighting image is larger than a second threshold is segmented as a luminous region, and the luminance value of the image region segmented as a luminous region is corrected with the luminance value included in a luminous region of a lighting image or a non-lighting image.

According to an embodiment of the invention, visibility of a high-reflection region can be enhanced because a region in an image whose luminance value of a non-lighting image is smaller than a third threshold, and whose luminance value of the lighting image is larger than a fourth threshold is segmented as a high-reflection region, and the luminance value of the image region segmented as a high-reflection region is corrected based on a value obtained by correcting the luminance value of the high-reflection region of the non-lighting image.

According to an embodiment of the invention, the luminance value of a low-luminance region can be corrected appropriately because a region in an image whose luminance value of the non-lighting image is larger than the luminance value of the lighting image is segmented as a low-luminance region, and whose luminance value of an image region segmented as a low-luminance region is corrected based on a value obtained by correcting the luminance value of the low-luminance region of the lighting image.

According to an embodiment of the invention, visibility of a night vision image can be further enhanced because a subject is taken by a visible light camera to acquire its visible light image, and pixel values of the luminance region and the high-reflection region are generated by using the visible light image.

As can be seen, the night vision apparatus according to an embodiment of the invention is useful, for example, for a night vision apparatus that takes a night vision image by using infrared light, and is particularly suitable for a case where visibility of a night vision image needs to be enhanced regardless of characteristics of a subject.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A night vision apparatus for taking an image of a subject by using reflected light of infrared light emitted, the night vision apparatus comprising:
    an image segmenting unit configured to segment said image into a plurality of regions based on a luminance value of a lighting image taken when the infrared light is emitted and a luminance value of a non-lighting image taken when the infrared light is not emitted; and
    a luminance value correcting unit configured to correct luminance values of the regions based on characteristics of the regions segmented by the image segmenting unit, wherein
    the image segmenting unit is further configured to segment a first region in said image whose luminance value of the non-lighting image is smaller than a first threshold, and whose luminance value of the lighting image is larger than a second threshold as a high-reflection region, and
    the luminance value correcting unit is further configured to correct the luminance values of the first region based on the luminance values of the corresponding region of the non-lighting image.

2. The night vision apparatus according to claim 1, wherein
    the image segmenting unit is further configured to segment a second region in said image whose luminance value of the non-lighting image is larger than a third threshold, and whose luminance value of the lighting image is larger than a fourth threshold as a luminous region, and
    the luminance value correcting unit is further configured to correct the luminance values of the second region with the luminance values included in the corresponding luminous region of the lighting image or the non-lighting image.

3. The night vision apparatus according to claim 1, wherein
    the image segmenting unit is further configured to segment a second region in said image whose luminance value of the non-lighting image is larger than the luminance value of the lighting image as a low-luminance region, and
    the luminance value correcting unit is further configured to correct the luminance values of the second region based on the luminance values of the corresponding region of the lighting image.

4. A computer readable non-transitory storage medium having stored therein a night vision image processing program, the night vision image processing program causing a computer to execute a process comprising:
    segmenting an image into a plurality of regions based on a luminance value of a lighting image taken by an infrared camera when infrared light is emitted and a luminance value of a non-lighting image taken by the infrared camera when the infrared light is not emitted; and
    correcting luminance values of the regions based on characteristics of the regions segmented at the segmenting, wherein
    the segmenting includes segmenting a first region in said image whose luminance value of the non-lighting image is smaller than a first threshold, and whose luminance value of the lighting image is larger than a second threshold as a high-reflection region, and
    the correcting includes correcting the luminance values of the first region based on the luminance values of the corresponding region of the non-lighting image.

* * * * *